Dec. 20, 1932.　　S. R. OLDHAM ET AL　　1,891,442
WELDING TORCH
Filed Aug. 20, 1929　　2 Sheets-Sheet 1

INVENTOR
Samuel R. Oldham
BY Lloyd W. Young
Byrnes Townsend & Bruckenstein
their ATTORNEYS.

Dec. 20, 1932.                S. R. OLDHAM ET AL                1,891,442
                                 WELDING TORCH
                         Filed Aug. 20, 1929        2 Sheets-Sheet 2

INVENTOR
Samuel R. Oldham
BY Lloyd W. Young
Byrnes Townsend & Brickenstein
their ATTORNEYS.

Patented Dec. 20, 1932

1,891,442

UNITED STATES PATENT OFFICE

SAMUEL R. OLDHAM AND LLOYD W. YOUNG, OF CHICAGO, ILLINOIS, ASSIGNORS TO THE OXWELD RAILROAD SERVICE COMPANY, A CORPORATION OF DELAWARE

WELDING TORCH

Application filed August 20, 1929. Serial No. 387,199.

Our invention relates to welding torches and particularly to new and advantageous details of the construction thereof. It has for an object the prevention of flashbacks, a term used to designate the continuous burning of the gas mixture within the torch passages. It has for other objects the provision for a more convenient handle member; the provision for more convenient means for holding and operating the torch; and a new method of mixing the gases for combustion. Still other objects are the provision of a single mixer member adapted to use with low pressure gases and a variety of tip sizes, more complete scavenging of the gases after a backfire, a term used to designate the momentary burning of the gases within the torch passages.

Our invention provides a new and useful torch for the production of an oxy-acetylene flame for fusion welding having a new type of mixer incorporated in its construction, in which a plurality of oxygen jets are provided, cooperating with acetylene gas supplied through a similar number of passages, mixing the gases at high speed during flow through a like number of small channels, and discharging the mixed gases into a single conduit leading to the welding tip. This new and useful mixer is adapted to cooperate with a new valve and handle construction whereby the handle is attached to the body and associated welding tip at a small angle, facilitating the holding thereof, and a pair of gas controlling valves are positioned between the handle and the body, convenient to the operator's fingers for adjustment by the fingers of the hand which holds the torch.

By this construction we are enabled to produce a welding torch which is much more convenient to use and in which operation under conditions which may cause flashbacks, such as may occur during obstruction of the welding tip, is much more easily maintained, since the small mixing channels cool and extinguish the backfire flame much more satisfactorily than previous constructions, and thereby decrease the liability of a flashback being produced from a backfire and the necessity for shutting off one of the gases to extinguish the flashback flame inside the torch. This desirable feature is obtained by the combination of high gas speed and small passages made possible by the multiple mixing members. Likewise, it is possible because of this multiple construction to utilize a single mixer with a wide range of tip sizes, and still retain the desirable backfire extinguishing properties, adequate mixing, and other necessary features.

Other objects and structural details of our invention will be apparent from the following description when read in connection with the accompanying drawings; wherein.

Figure 2:
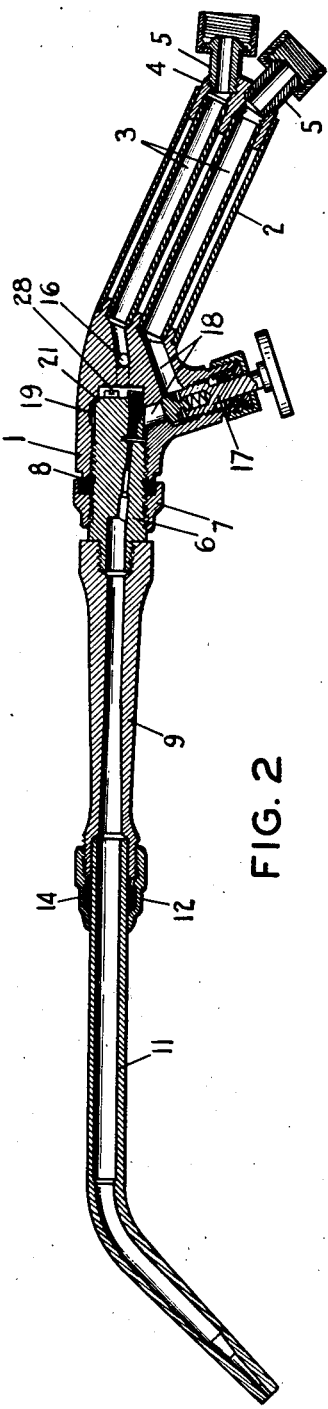
Figure 2 is a side view in section of the torch of our invention.
Figure 1:
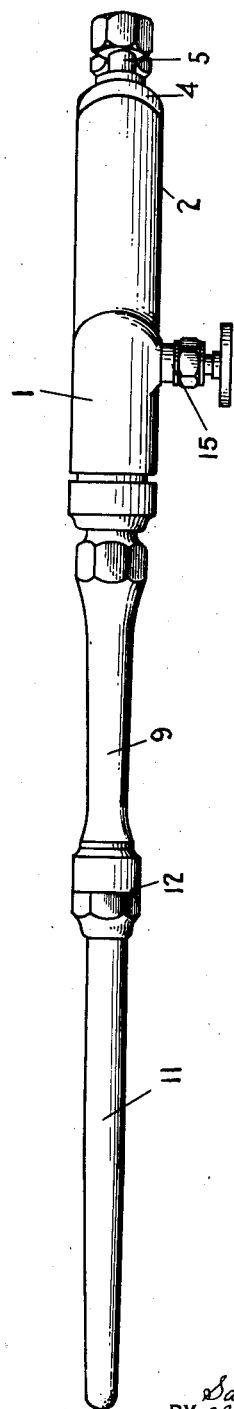
Figure 1 is a top view of the torch of our invention.

In constructing the torch of our invention, we desirably provide a body member 1, to which is attached a handle consisting of a shell member 2 enclosing tubular members 3, and closed with a plug 4 on which are mounted the half union members 5. The body member 1 has an opening or socket in which is mounted a mixer plug 6, which is surrounded by a packing gland nut 7 and packing 8. To the end of the mixer plug 6 is attached a tubular member 9, to which in turn is attached the tip 11, held in place by a jam nut 12; within which is positioned a packing member 14.

The tip member 11 is desirably bent at a convenient angle as shown, which angle may desirably be approximately 45°. The handle member 2 is also desirably mounted upon the body member 1 at an angle which may conveniently be from 20 to 30°.

The upper tube 3 in the handle 2 is desirably connected to the oxygen supply, and a valve 15 is provided in the channel 16 within the body member 1 for the control of the oxygen gas stream. The channel 16 leads to the inner end of the opening in the body 1 within which the mixer plug 6 is positioned.

The lower one of the tubes 3 is desirably connected to the acetylene supply and equipped with a valve 17 controlling the flow of gas in the passage 18. The passage 18 leads to an annular channel 19 around the opening in the body 1 and around the mixer member 6. The annular channel 19 and the end of the socket in the body are desirably separated by a chamfered edge 21 which cooperates with a similar chamfered edge 22 upon the mixer plug 6 to make a gastight separating joint between the spaces to which the respective gases are supplied.

Figure 4:
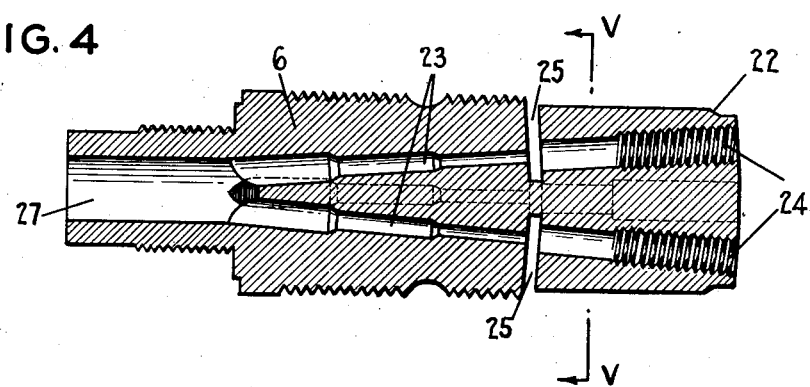
Figure 4 is a larger view also in section of the mixer plug of our invention.
Figure 5:
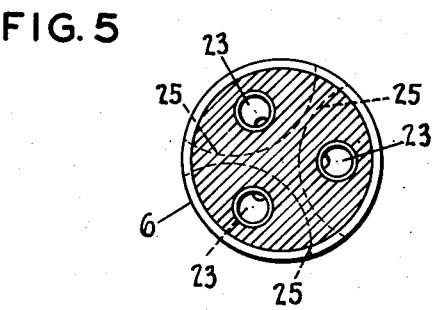
Figure 5 is a section of the mixer plug along the lines V—V of Figure 4.

Referring to Figure 4, the mixing plug 6 is provided with a bore 27 through which the mixed gases are discharged to the conduit member 9. A plurality of mixing ducts 23 are provided in the body of the mixer plug 6, connecting with the bore 27. These ducts are desirably three in number, but two or more may be used according to the convenience of construction and the requirements of the service for which the torch is to be used. The ducts 23 are desirably positioned at a slight angle to the axis of the plug body 6 as shown.

Figure 3:
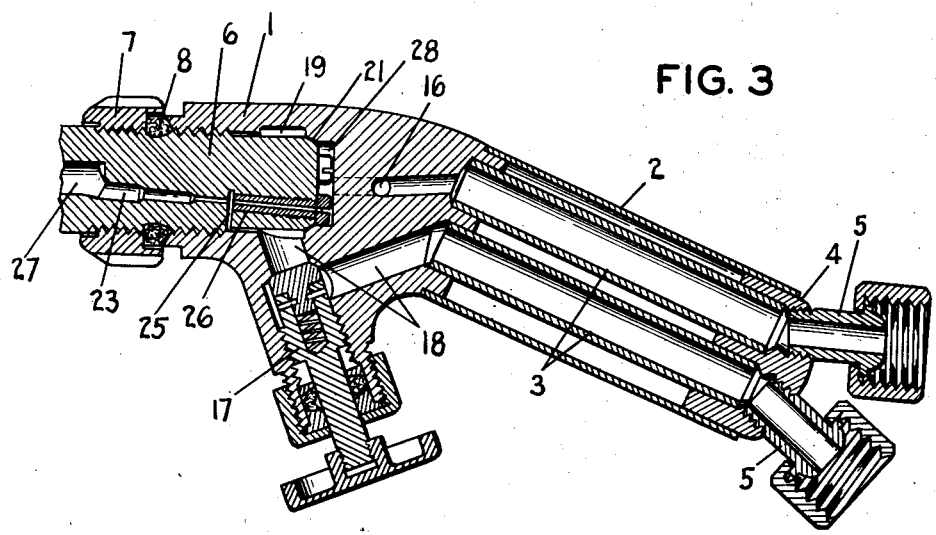
Figure 3 is an enlarged section in further detail of the mixer member of the torch of our invention.

Coaxially with the ducts 23 are provided a similar number of threaded channels 24, the line of separation between the channels 24 and the ducts 23 being set by the slits 25. Within the channels 24 are positioned jet members 26 as shown in Figure 3. These are provided with axial jet passages and are threaded upon the outside and provided with slotted heads for convenience in assembling.

It will be noted that the annular channel 19 cooperates and connects with slits 25 when the member 6 is positioned within the body 1, and that the heads of the jet members 26 enter the chamber at the end of the duct in the body 1.

In the operation of the torch of our invention, the oxygen and acetylene valves may be opened in the usual way, whereupon the oxygen passes from the union 5 through one of the tubes 3, the channel 16, and the valve 15 to the head 28 of the pocket in the body 1. The chamfers 21 and 22 prevent passage of the oxygen around the sides and past the end of the plug, while the passages in the jet members 26 permit the oxygen to pass through the body of the plug. The acetylene likewise passes from the union 5 through a tube 3, the passage 18, and the valve 17 into the annular channels 19 and the slits 25 where it is met by the jet of oxygen and mixed therewith, during travel through the ducts 23. It then flows into the passage 27 from which it travels through the tubular member 9 to the tip 11, at the end of which it is burned for the welding operations. The torch is conveniently held by the handle 2, which because of its angular relationship to the body adapts it particularly to convenient, easy, manipulation. Similarly, the position of the valves 15 and 17 just forward of the handle member 2 permits of convenient manipulation thereof by the fingers of the hand which holds the torch, thereby avoiding the necessity of laying down the welding rod or other article held by the operator's other hand for adjustment of the valves.

Welding is thus conveniently performed by the torch under normal conditions.

When a mischance occurs in the welding which might cause a "flashback", the torch is particularly convenient, because of the fact that the backfire flame proceeds only as far as the channels 23, being extinguished in the channels 23 by the cooling effect and the high speed of movement of the gases before it reaches the slits 25 where the oxygen and acetylene are mixed. The pressure caused by the "flashback" flame also drives a certain amount of burned vapor backward into the annular passage 19 and the chamber 27, displacing the unburned gases therefrom. In consequence, when the flashback flame has burned all of the mixed gases in the torch channels, and the flow of gas begins again in its normal direction, the first mixing of gases occurs between portions of burned gas, followed by fresh gases which thereafter sweep out the burned gas. In this way the backfire causes an actual separation for a substantial moment of the fresh combustible gases, thereby effectively extinguishing the backfire flame. Accordingly, the backfire flame is extinguished without the necessity for turning off either the oxygen or acetylene or disturbing the adjustment of the valves as is required to extinguish a flashback. The continuing flow of the supply of gases then scavenges the burned gases ahead of them and clears them out of the torch body and tip, whereupon the mixed gases may be reignited at the torch tip to produce a regulated welding flame similar to that adjusted before the backfire occurred. This factor of operation is particularly convenient because of the saving in time otherwise required to shut and re-adjust the supply valve.

By this construction we have thus obtained a new, useful and convenient welding torch, which is particularly convenient under normal welding conditions and which permits of substantial and valuable saving in time under conditions which produce backfires, as well as having other valuable features.

While we have shown but a single embodiment of the device of our invention, it is capable of other modifications therefrom, without departing from the spirit thereof and we desire that, therefore, only such limitations shall be imposed upon the appended claims as are stated therein or required by the prior art.

We claim as our invention:

1. A welding torch comprising a body member having a pocket therein, a mixing device mounted within said pocket, a flame tip member cooperating therewith, a handle attached to said body at an angle, gas supply passages within said handle, and valve members cooperating between said gas supply passages and said mixing member, said mixing member comprising a plurality of small mixing jet members, the size thereof being sufficiently small to extinguish a flame within.

2. A welding torch comprising a body member having gas channels and valves therein, and a pocket having an annular channel therearound, a closed end, and a chamfer bearing surface therebetween, a mixing member adapted to be positioned therein having a second chamfer portion cooperating with said first mentioned chamfer to make a gas tight joint, said gas channels leading respectively to said annular channel and to the end of said pocket, said mixing member having a plurality of oxygen jet producing portions cooperating with the end of said pocket, and a plurality of acetylene supply slits cooperating with said annular channel, and a plurality of mixing passages cooperating with both thereof.

3. A welding torch comprising a handle having gas conduits therethrough; means at the rear of said handle for supplying suitable gases to said conduits; a body member attached to the forward end of said handle having a pocket therein communicating with said conduits; means at the rear of said body for regulating the flow of gases from said conduits to said pocket; a mixing device in said pocket having a plurality of removable gas injector nozzles and a single outlet; each of said nozzles being adapted for directing a jet of oxygen through a narrow chamber containing acetylene into a mixing duct; each of said ducts connecting one of said chambers with said outlet and having gas mixing cylindrical portions each larger than the one behind it; a gas mixing conduit member attached to said outlet; and means for connecting tips of various sizes to said conduit.

4. A welding torch comprising a body member having a pocket therein; means for supplying suitable gases to said pocket; a mixing device in said pocket having a plurality of removable gas mixing injector nozzles each adapted for directing a jet of oxygen through a narrow chamber containing acetylene; a gas mixing duct connecting each of said chambers with said outlet having cylindrical portions each larger than the one behind it; a gas mixing conduit member attached to said outlet; and means for connecting tips of various sizes to said conduit.

5. A welding torch comprising a body member and means for supplying suitable gases thereto; a mixing device in said body having a single mixture outlet; a plurality of gas mixing ducts in said mixing device; a plurality of acetylene gas chambers in said mixing device; a plurality of removable gas injector nozzles in said mixing device each adapted for directing a jet of oxygen through one of said chambers into one of said ducts; and means for connecting tips of various sizes to said outlet.

6. A welding torch comprising a body member and means for supplying suitable gases thereto; a torch tip; and a mixing device therebetween having a single outlet and a plurality of removable nozzles each adapted for directing a jet of oxygen through a narrow chamber containing acetylene into a mixing duct having a plurality of cylindrical portions each larger than the one behind it.

7. A welding torch comprising a body member and means for supplying suitable gases thereto; a mixing device connected to said body having a plurality of injector nozzles and a single outlet; a progressively enlarging gas mixing duct between each of said nozzles and said outlet; and a progressively enlarging gas mixing conduit connected to said outlet.

8. A welding torch comprising a body member adapted to be supplied with oxygen and a combustible gas; a tip; a mixing device between said body member and said tip; said device having one or more transverse chambers connected to said combustible gas supply; a plurality of oxygen passages connected to said oxygen supply and each adapted to discharge a jet of oxygen through one of said chambers which is sufficiently large to envelop said oxygen jet with the combustible gas contained therein; a mixing tube for each of said oxygen jets in axial alignment therewith on the opposite side of said chamber; and a single conduit adapted to receive the discharged gas mixture from each of said mixing tubes and conduct said mixture to said tip.

9. A welding torch comprising a body member adapted to be supplied with oxygen and a combustible gas; a tip; a mixing device between said body member and said tip; said device having one or more slot shaped chambers therein connected to said combustible gas supply; a plurality of oxygen passages each adapted to discharge a jet of oxygen through one of said slot shaped chambers; a mixing tube for each of said jets in axial alignment therewith on the opposite side of said slot shaped chamber; and a single conduit adapted to receive the discharged gas mixture from each of said mixing tubes and conduct said mixture to said tip.

10. A welding torch comprising a body member having a pocket therein; means for supplying oxygen to one portion of said pocket and means for supplying a combustible gas to another portion of said pocket; a mixing plug secured into said pocket and separating the respective inlets of the gases in said pocket and thereby dividing said pocket into an oxygen chamber and a combustible gas chamber; said mixing plug having one or more transverse chambers formed therein and communicating with said combustible gas chamber; a plurality of oxygen passages extending from said oxygen chamber and each adapted to discharge a jet of oxygen into and through one of said transverse chambers; a plurality of mixture passages on the opposite side of said transverse chambers; each of said mixture passages being in alignment with and adapted to receive one of said oxygen jets; and a single passage adapted to receive the oxygen and combustible gas discharged from said mixture passages; and a tip adapted to receive the gas mixture from said single passage.

In testimony whereof, we affix our signatures.

SAMUEL R. OLDHAM.
LLOYD W. YOUNG.